April 28, 1942. H. P. GROHN 2,281,432
AUTOMATIC MECHANICAL POWER CUT OUT
Filed Oct. 7, 1940 2 Sheets-Sheet 1

HENRY P. GROHN.
INVENTOR.
BY John B. Hosty
ATTORNEY.

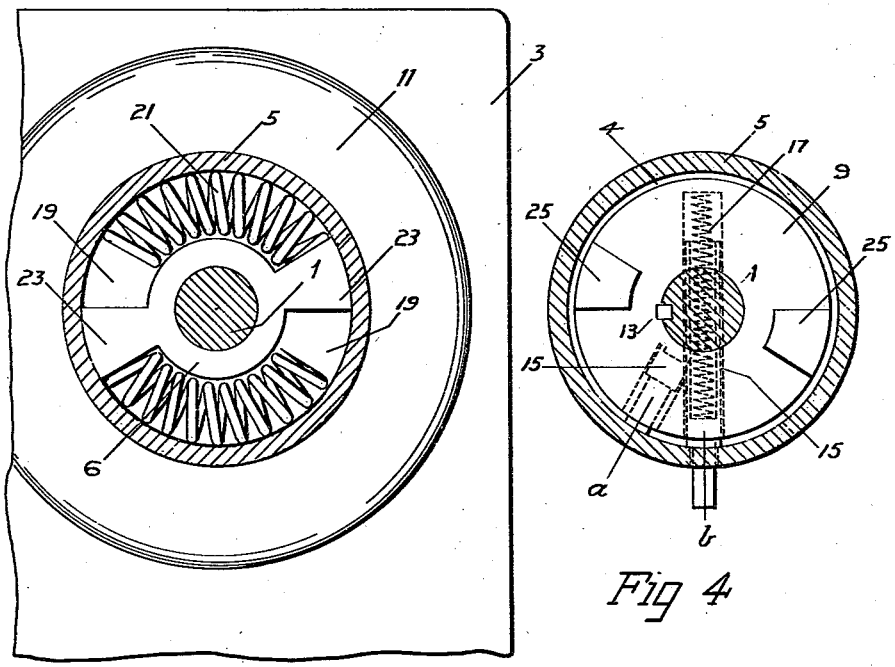
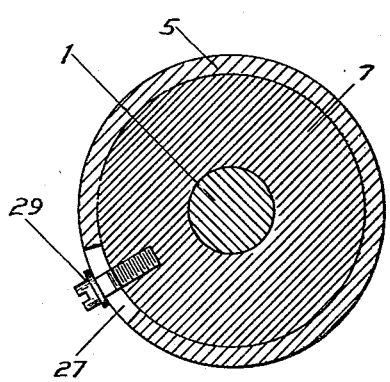
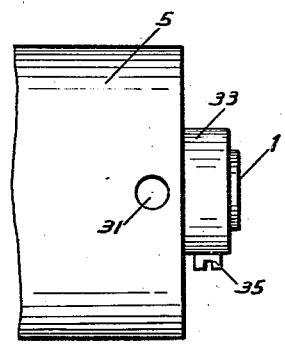

Patented Apr. 28, 1942

2,281,432

UNITED STATES PATENT OFFICE 2,281,432

AUTOMATIC MECHANICAL POWER CUTOUT

Henry P. Grohn, Chicago, Ill., assignor, by direct and mesne assignments, of fifty per cent to John J. Pubins, seventeen and one-half per cent to Frank Kunza, seven and one-half per cent to Fred W. Grohn, and five per cent to Gus Skly, all of Chicago, Ill.

Application October 7, 1940, Serial No. 360,138

6 Claims. (Cl. 192—150)

My invention relates to improvements in automatic mechanical power cut outs.

The purpose of my device is to automatically cut out the electric power on various types of machines when a predetermined overload is placed on the driving power because of the failure or "jamming" of parts. When the power is cut off the machine is repaired or freed of obstructions, and by a manually operated switch the power is again applied.

In these specifications and drawings my device is attached to a coal stoker. Oftentimes, iron or other foreign matter gets in coal and "jams" the coal screw conveyer at the crushing block. One device now in use to prevent serious damage to stokers if the machines are not stopped immediately, is a pin which shears off from an overload. This requires considerable replacement, labor and expense. In my device when the coal screw conveyer jams, the power is shut off immediately, and a warning light is illuminated or a bell rung. The obstruction is removed, and by manually operating the starting switch the power is again applied. No repairs are necessary.

While the attached drawings describe my device as used on a stoker, the device may be used on any number of different machines.

For further comprehension of my invention and of the objects and advantages thereof, reference will be had to the following description and accompanying drawings, and to the appended claims in which the various novel features of the invention are more particularly set forth.

In the accompanying drawings, forming a material part of this disclosure:

Figure 4 is a cross-section at BB of Figure 1, viewed from left to right.

Figure 5 is a cross-section at BB of Figure 1, viewed from right to left.

Figure 6 is a cross-section at EE of Figure 1.

Figure 7 is a detail of housing 5, viewed upward from switch.

Similar numerals refer to similar parts throughout the several views.

Figure 1:
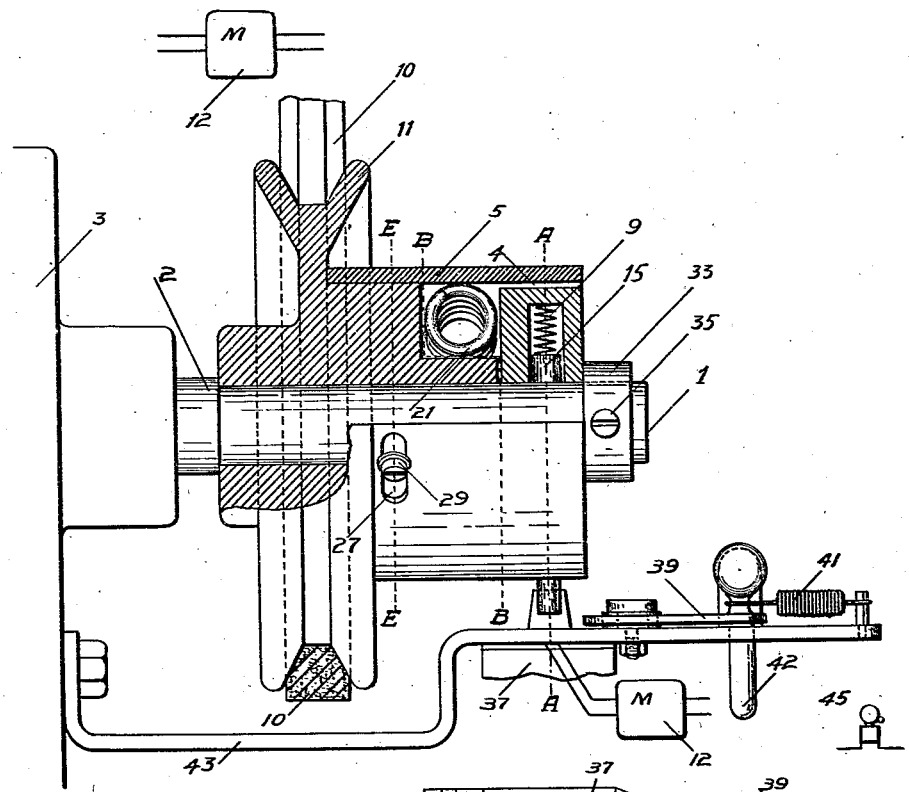
Figure 1 is a partially sectional side view of my invention mounted on the drive shaft of a coal stoker speed reducer.
Figure 2:
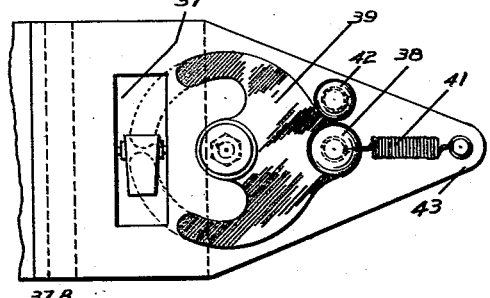
Figure 2 is a view of the switch arrangement viewed from above Figure 1.
Figure 3:
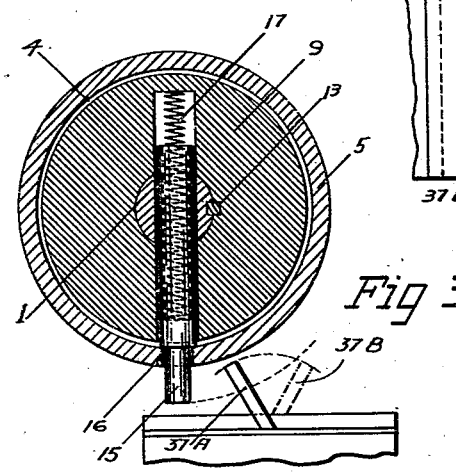
Figure 3 is a cross-section at AA of Figure 1.

This device, identified by me as an automatic mechanical power cut out, is mounted on a power shaft 1, which shaft is set in gear housing 3. This shaft is powered by motor 12, pulley 11 and belt 10. Pulley 11 and male clutch member 7 are in one piece, and their bearing 6 loosely encircles shaft 1. Housing 5 encases male clutch member 7 and female clutch member 9. Housing 5 fits rather snugly around male clutch member 7, but the diameter of female clutch member 9 is slightly less than the diameter of male clutch member 7, so that there is a space 4 between housing 5 and female clutch member 9, which space 4 enables housing 5 and the associated parts to serve as a flexible coupling.

Female clutch member 9 is rigidly affixed to shaft 1 by key 13. Arched coil springs 21 are inserted in recesses 19 in male clutch member 9, and are held in place by housing 5 and lugs 23 which separate said recesses 19. In recesses 19, space is provided counter-clockwise to springs 21 for the reception of lugs 25 of female clutch member 9. Female clutch member 9 is provided with a trickler pin 15 under pressure of coil spring 17. Housing 5 is provided with aperture 31 from which aperture, trickler pin 15 plunges when overload reaches the predetermined load. Adjacent to pulley 11, housing 5 is provided with slot 27, through which slot overload regulator 29 is inserted in male clutch member 7. Regulator 27 also fastens pulley 11 and male clutch member 7 securely to housing 5. Collar 33 is fastened to shaft 1 by set screw 35, and secures my entire apparatus on shaft 1. Oversize of shaft 1 at 2 prevents the device from sliding away from desired position on shaft 1.

Three way switch 37 is set immediately below the path of aperture 31 on housing 5, so as to come in contact with trickler pin 15, when said trickler pin is forced through aperture 31. Switch 37 may be manually operated by knob 38 on control switch 39, which is held in a neutral position by spring 41. Bracket 43, fastened to housing 3, bears switch 37 and related parts. A warning bell 45 (which can also be a light or other warning signal), is sounded by the operation of switch 37. A socket is provided adjacent to switch 39 for pin 42, which pin is used to force trickler pin 15 back in position after its expulsion from slot 31. 37A and 37B indicate "on and off" positions of switch 37.

By moving regulator 29 up or down the predetermined overload of the machine is increased or decreased, and the regulator is set sufficiently high so that starting overloads will not cause the cut out to function. Before the power is applied, trickler pin 15 is forced inwardly through aperture 31 and assumes a position relatively at $a$ in Figure 4 through the pressure of springs 21 on lugs 25. The machine is started, springs 21 become compressed from the starting load but not enough to effect the expulsion of trickler pin 15. As springs 21 recoil from the starting load the machine operates normally and springs 21 are compressed to a certain degree, trickler pin 15 retaining substantially its $a$ position. However, if a piece of iron or other foreign matter clogs the coal screw conveyer of a stoker, or any other parts of a machine equipped with my invention, an excessive overload is placed on the machine. Springs 21 are abnormally compressed by the pressure of lugs 25 on these springs to such an extent that when the load reaches the predetermined volume, trickler pin 15 is forced from its position at $a$ in Figure 4 to its position at $b$ in Figure 4, and upon reaching aperture 31 trickler pin 15 plunges through this aperture. On the next revolution of housing 5 trickler pin 15 comes in contact with switch 37. The power is immediately shut off and the machine stops. When the machine is again ready for operation, trickler pin 15 is forced back through aperture 31 by pin 42, and resumes its position at $a$. Power is applied by manually operating switch 39.

I have illustrated and described the preferred embodiments of my invention, but it is to be understood that I do not limit myself to the precise constructions herein disclosed, and the right is reserved to all changes and modifications coming within the scope of the invention, as defined in the appended claims.

Having thus described my invention, what I claim as new and desire to protect by Letters Patent of the United States is:

1. In a power cut out, held axially on a shaft, a driving unit rotatable on said shaft, a plurality of resilient members in a plurality of recesses in said driving unit and, of lesser periphery and rigid on said shaft, a dependent member carrying a plurality of protruding lugs axially engaged counter-clockwise against said resilient members, a trickler pin in said dependent unit at right angles to said shaft, a sleeve encasing said driving and dependent units to form a flexible coupling, an overload regulator anchoring said sleeve to said driving unit and adjusting the predetermined overload by adjusting the engaging pressure of the respective members, thus varying the relative position of said trickler pin, and when the predetermined overload is placed on said resilient members, said members compress sufficiently to partially release said trickler pin through an aperture in said housing and against the power switch which is directly in the path of said released pin.

2. In a power cut out, held axially on a shaft, a driving unit rotatable on said shaft, a plurality of resilient members in a plurality of recesses in said driving unit and, of lesser periphery and rigid on said shaft, a dependent member carrying a plurality of protruding lugs axially engaged counterclockwise against said resilient members, a trickler pin in said dependent unit at right angles to said shaft, a sleeve encasing said driving and dependent units, an overload regulator anchoring said sleeve to said driving unit and adjusting the predetermined overload by adjusting the engaging pressure of the respective members, thus varying the relative position of said trickler pin, and when the predetermined overload is placed on said resilient members, said members compress sufficiently to partially release said trickler pin through an aperture in said housing and against the power switch which is directly in the path of said released pin.

3. In a power cut out, on a shaft, a somewhat rotatable driving unit radially powering said shaft by the pressure of its resilient members against non-resilient members of an engaging rigid axially disposed dependent unit of somewhat less periphery than the periphery of the driving unit, a trickler pin in said dependent unit at right angles to said shaft, a housing encasing said units to form a flexible coupling, an overload regulator anchoring said housing to said driving unit and regulating the overload by adjusting the pressure of the resilient members against the non-resilient members, and when the predetermined overload sufficiently compresses the resilient members of said driving unit, the said trickler pin is partially released through an aperture in said housing and said trickler pin releases directly in the path of and against the machine switch.

4. In a power cut out, on a shaft, a somewhat rotatable driving unit radially powering said shaft by the pressure of its resilient members against non-resilient members of an engaging rigid axially disposed dependent unit of somewhat less periphery than the periphery of the driving unit, a trickler pin in said dependent unit at right angles to said shaft, a housing encasing said units, an overload regulator anchoring said housing to said driving unit and regulating the overload by adjusting the pressure of the resilient members against the non-resilient members, and when the predetermined overload sufficiently compresses the resilient members of said driving unit, the said trickler pin is partially released through an aperture in said housing and said trickler pin releases directly in the path of and against the machine switch.

5. In a power cut out, a driving unit loosely encircling a power shaft, and equipped with a plurality of arched coiled springs in an equivalent plurality of recesses separated by lugs, and rigidly on said shaft, an engaging axially disposed dependent unit of slightly less periphery than said driving unit and on the engaging surface of said dependent unit a plurality of protruding lugs for engagement counter-clockwise against said coil springs in said recesses in said driving unit, and at right angles to the power shaft in said dependent unit a trickler pin under inward pressure, and a sleeve rigidly fastened to said driving unit equipped with a regulator for setting the predetermined overload of an attached machine, an aperture in said sleeve for releasing said trickler pin when the machine is subjected to the predetermined overload, the path of said trickler pin aperture being directly above the power switch of said attached machine so that the trickler pin when released comes in contact with the switch and the power is shut off, said parts of said device are firmly held against a flange on said power shaft by means of a collar and set screw flush against the outside of dependent unit.

6. In a power cut out, a driving unit loosely encircling a power shaft, and equipped with a plurality of arched coiled springs in an equivalent plurality of recesses separated by lugs, and rigidly on said shaft, an engaging axially disposed dependent unit of slightly less periphery than said driving unit and on the engaging surface of said dependent unit a plurality of protruding lugs for engagement counter-clockwise against said coil springs in said recesses in said driving unit, and at right angles to the power shaft in said dependent unit a trickler pin under inward pressure, and a sleeve rigidly fastened to said driving unit forming a flexible coupling and equipped with a regulator for setting the predetermined overload of an attached machine, an aperture in said sleeve for releasing said trickler pin when the machine is subjected to the predetermined overload, the path of said trickler pin aperture being directly above the power switch of said attached machine so that the trickler pin when released comes in contact with the switch and the power is shut off, said parts of said device are firmly held against a flange on said power shaft by means of a collar and set screw flush against the outside of dependent unit.

HENRY P. GROHN.